United States Patent
Hedman et al.

(10) Patent No.: US 9,506,538 B2
(45) Date of Patent: Nov. 29, 2016

(54) IDLER OR ROLLER DEVICE

(71) Applicants: Torbjorn Hedman, Saint Cyr sur Loire (FR); Romuald Lescorail, Saint Cyr sur Loire (FR); Frederic Liege, Monts (FR); Nicolas Tronquoy, Fondettes (FR)

(72) Inventors: Torbjorn Hedman, Saint Cyr sur Loire (FR); Romuald Lescorail, Saint Cyr sur Loire (FR); Frederic Liege, Monts (FR); Nicolas Tronquoy, Fondettes (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/662,263

(22) Filed: Mar. 19, 2015

(65) Prior Publication Data

US 2015/0267790 A1    Sep. 24, 2015

(30) Foreign Application Priority Data

Mar. 19, 2014 (FR) ..................... 14 52269

(51) Int. Cl.

| F16H 7/20 | (2006.01) |
|---|---|
| F16H 55/36 | (2006.01) |
| F16H 57/00 | (2012.01) |
| F16C 13/00 | (2006.01) |
| F16C 35/073 | (2006.01) |
| F16C 33/58 | (2006.01) |
| F16B 41/00 | (2006.01) |
| F16H 7/08 | (2006.01) |

(52) U.S. Cl.
CPC ............ *F16H 7/20* (2013.01); *F16C 13/006* (2013.01); *F16C 33/586* (2013.01); *F16C 35/073* (2013.01); *F16H 55/36* (2013.01); *F16H 57/0031* (2013.01); *F16B 41/002* (2013.01); *F16C 2361/63* (2013.01); *F16H 2007/0865* (2013.01); *F16H 2057/0093* (2013.01)

(58) Field of Classification Search
CPC .... F16C 13/006; F16C 2361/63; F16H 7/20; F16H 2007/0865; F16H 55/36
USPC .................................................. 474/198, 199
See application file for complete search history.

(56) References Cited

U.S. PATENT DOCUMENTS

| 4,863,293 A * | 9/1989 | Sytsma ................. | F16C 13/006 277/366 |
|---|---|---|---|
| 6,241,257 B1 * | 6/2001 | Hauck ................... | F16B 41/002 277/637 |
| 6,357,926 B1 * | 3/2002 | Hauck ................... | F16C 13/006 384/546 |
| 7,695,385 B2 * | 4/2010 | Barraud ................. | F16C 19/06 384/484 |
| 8,235,851 B2 * | 8/2012 | Eidloth ................. | F16C 13/006 474/199 |
| 2004/0097313 A1 * | 5/2004 | Singer ................... | F16C 13/006 474/199 |

(Continued)

FOREIGN PATENT DOCUMENTS

| DE | 19836191 A1 | 2/2000 |
|---|---|---|
| DE | 202007010473 U1 | 9/2007 |

(Continued)

*Primary Examiner* — Henry Liu
(74) *Attorney, Agent, or Firm* — Bryan Peckjian; SKF USA Inc. Patent Dept.

(57) ABSTRACT

A tension roller or reel device for a torque transmission element. The device comprises at least one bearing having one inner race, one outer race and at least one row of rolling elements between the inner race and the outer race, a pulley on top of the outer race, and a retaining screw inserted into a central bore of the inner race. The bore of the inner race is provided with a circumferential cavity in which a retaining ring is fitted securely and integrally, the retaining ring comprising an interaction feature providing interaction with the screw so as to allow an axial immobilization of the screw in relation to the bearing.

20 Claims, 3 Drawing Sheets

(56) References Cited

U.S. PATENT DOCUMENTS

| | | | | |
|---|---|---|---|---|
| 2004/0235599 A1* | 11/2004 | Ozorak | ............... | F16C 13/006 |
| | | | | 474/199 |
| 2005/0261092 A1* | 11/2005 | Ochiai | ............... | F16D 41/066 |
| | | | | 474/70 |
| 2007/0025655 A1* | 2/2007 | Barraud | ............... | F16C 19/06 |
| | | | | 384/546 |
| 2007/0072714 A1* | 3/2007 | Filip | ............... | F16C 13/006 |
| | | | | 474/144 |
| 2008/0220921 A1* | 9/2008 | Yanai | ............... | F16H 55/48 |
| | | | | 474/199 |
| 2009/0098967 A1* | 4/2009 | Eidloth | ............... | F16C 13/006 |
| | | | | 474/199 |
| 2009/0298630 A1* | 12/2009 | Mineno | ............... | F16C 35/063 |
| | | | | 474/199 |
| 2010/0016109 A1* | 1/2010 | Walton | ............... | F16H 55/50 |
| | | | | 474/199 |
| 2012/0142470 A1* | 6/2012 | Varnnoux | ............... | F16C 13/006 |
| | | | | 474/199 |

FOREIGN PATENT DOCUMENTS

| | | |
|---|---|---|
| DE | 102007039131 A1 | 2/2009 |
| EP | 1841972 B1 | 3/2011 |
| EP | 2339211 A1 | 6/2011 |
| WO | 2007085333 A1 | 8/2007 |
| WO | 2010006857 A1 | 1/2010 |

\* cited by examiner

IDLER OR ROLLER DEVICE

CROSS REFERENCE TO RELATED APPLICATIONS

This is a Non-Provisional patent application, filed under the Paris Convention, claiming the benefit of French Patent Application Number 1452269 filed on 19 Mar. 2014, which is incorporated herein by reference in its entirety.

FIELD OF THE INVENTION

The present invention relates to the field of tension rollers or reels intended to interact with a torque transmission element such as a chain or a belt, for example a timing belt of an internal combustion engine of a motor vehicle.

PRIOR ART

Such tension rollers or reels are generally used to maintain a constant tension on the torque transmission element within a set range or to modify locally the pathway adopted by the latter. In such rollers, a pulley is rotatably mounted on an axis by means of a bearing, the roller subsequently being attached directly or indirectly to the engine block or to an element of the tension roller device, for example an articulated arm or an eccentric.

It is generally known to provide the bearing with a central bore into which a threaded screw is inserted, the screw being intended to be screwed into a tapped opening provided on a wall of the engine block in such a way as to permit the attachment of the roller on the engine block.

The tension roller comprising the pulley, the bearing and the screw is preassembled at the manufacturer's premises before subsequently being delivered as a construction module to the assembly site of the motor vehicle engine. It is therefore necessary to provide a means of retaining the screw in the roller in order to prevent any movement or shock during transport and likewise to supply a construction module that is ready for mounting directly on the engine block.

It is known from the prior art to provide a tension roller or reel for a torque transmission element of a sleeve mounted in the bore of the bearing, the sleeve likewise being provided with a bore into which the screw fits.

Document EP 2 339 211 A1 describes a sleeve comprising an annular washer mounted in a cavity at one of its extremities, the annular washer being an interference fit in a throat provided on the cylindrical outer surface of the screw, thus assuring its axial restraint.

In DE 198 36 191 A1, only one annular washer is mounted tightly in the bore of the bearing, the annular washer likewise being an interference fit in a throat provided on the cylindrical outer surface of the screw.

However, this requires the use of a specific screw having a throat in its outer periphery in place of a standardized screw, thereby increasing the number of manufacturing stages and the cost of such a tension roller or reel.

Also familiar is document EP 1 841 972 B1, which proposes a sleeve made from a polymer material that is pre-mounted around the threaded part of the screw and is then heated in such a way as to adopt the outer peripheral shape of the screw, before subsequently being mounted tightly in the bore of the bearing. However, this method of manufacture requires the roller manufacturers to have access to unusual specific equipment. Moreover, the shape and the dimensions of the sleeve after the heating stage are difficult to control.

Furthermore, the use of such sleeves or means of retention for the screw in these documents entails a certain radial clearance for its insertion radially between the screw and the bearing, this clearance not being available in the applications where space is at a premium.

OBJECT AND BRIEF SUMMARY OF THE INVENTION

The invention proposes more particularly to address these problems by proposing a new tension roller or reel that is simple to produce and to install, with a reduced number of elements and assuring the effective retention of the screw in a reduced space.

For this purpose, the invention relates to a tension roller or reel device for a torque transmission element comprising at least one bearing having one inner race, one outer race and at least one row of rolling elements between the inner and outer races, a pulley on top of the outer race and a retaining screw inserted into a central bore of the inner race.

In accordance with the invention, the bore of the inner race is provided with a circumferential cavity in which a retaining ring is fitted securely and integrally, the retaining ring comprising means of interaction with the screw so as to allow an axial immobilization of the screw in relation to the bearing.

The cavity provided in the bore of the inner race consists of a circumferential cylindrical portion having a radial diameter that is greater than the radial diameter of the cylindrical surface of the bore.

Thanks to the invention, the immobilization of the screw in the bearing is realized by a retaining ring comprised axially between the two radial edges of the extremity of the inner race, thereby permitting a minimum axial dimension.

In addition, the retaining ring being integrated into an inner cavity of the inner race, the radial dimension is greatly reduced, since provision can be made for only the means of interaction with the screw to emerge radially from the cavity.

Another advantage of the present invention is that the retaining ring is mounted integrally in the cavity of the inner race and that a supplementary means of locking exists in at least one axial direction. The retaining ring is perfectly integral with the bearing while immobilizing the screw, in particular at the stage of inserting the screw into the roller, during which stage improper handling, such as excessively strong insertion, will not involve the removal of the retaining ring.

According to advantageous but not obligatory aspects of the invention, such a tension roller or reel device may incorporate one or a plurality of the following characterizing features taken in any technically permissible combination:

The rolling elements of the bearing are balls.
The rolling elements are rollers or needles.
The rolling elements of the bearing are maintained more or less regularly spaced circumferentially by a cage.
The outer race of the bearing forms the pulley of the roller device, in such a way that the outer cylindrical surface of the outer race interacts with the torque transmission element.
The cavity provided in the inner bore of the inner race extends axially between one extremity of the bore and a shoulder formed between a cylindrical surface forming the cavity and a cylindrical surface with a smaller diameter forming the bore.

The cavity extends axially between two shoulders formed at each extremity of a cylindrical surface forming the cavity and a cylindrical surface with a smaller diameter forming the bore.

The inner race comprises on a radial edge a blind opening, of which the diameter and the depth are adapted to receive all or part of a head of the screw in such a way that the extremity of the screw head does not extend axially beyond the bearing and/or the pulley.

The retaining ring is continuous circumferentially.

The retaining ring is made of an elastic polymer material.

The retaining ring is moulded in the cavity in the bore of the inner race.

The retaining ring is installed by force in the cavity in the bore of the inner race.

The retaining ring is provided with an axial slot, in such a way that the ring is compressed radially beforehand in order to insert it and to cause it to slide in the bore of the inner race and then in the cavity where it returns to its original shape.

The retaining ring is essentially tubular and has a radial thickness that is strictly greater than the depth of the cavity provided in the bore of the inner race.

The means of interaction of the retaining ring with the screw consist of the inner cylindrical surface of the retaining ring, the screw being installed by force into the retaining ring, and the axial immobilization of the screw being assured by radial tightening.

The retaining ring is essentially tubular and has a thickness that is less than or equal to the depth of the cavity provided in the bore of the inner race.

The means of interaction of the retaining ring with the screw consist of a plurality of radial projections directed towards the interior of the roller, the screw being installed by force into the projections, and the axial immobilization of the screw being assured by radial tightening.

The projections extend radially from a tubular portion and are likewise distributed in a circumferential manner in the bore formed by the tubular portion. Only the projections extend radially beyond the cylindrical surface of the bore of the inner race.

The projections consist of lugs of material.

The projections consist of tongues.

The means of interaction of the retaining ring with the screw consist of a threaded portion, the screw being installed by screwing into the portion, and the axial immobilization of the screw being assured by the interaction of the threads.

The threads of the threaded portion of the retaining ring are circumferential and extend radially from a tubular portion. Only the threads extend radially beyond the cylindrical surface of the bore of the inner race.

The invention likewise relates to an internal combustion engine comprising at least one tension roller or reel device for a torque transmission element according to one of the embodiments mentioned above.

BRIEF DESCRIPTION OF THE DRAWINGS

The invention will be more readily understood, and other advantages thereof will be appreciated more clearly, in the light of the following description of 3 embodiments of a tension roller or reel device consistent with its principle, given here only by way of example and made with reference to the accompanying drawings, in which.

DETAILED DESCRIPTION OF THE PRESENT INVENTION

Figure 1:
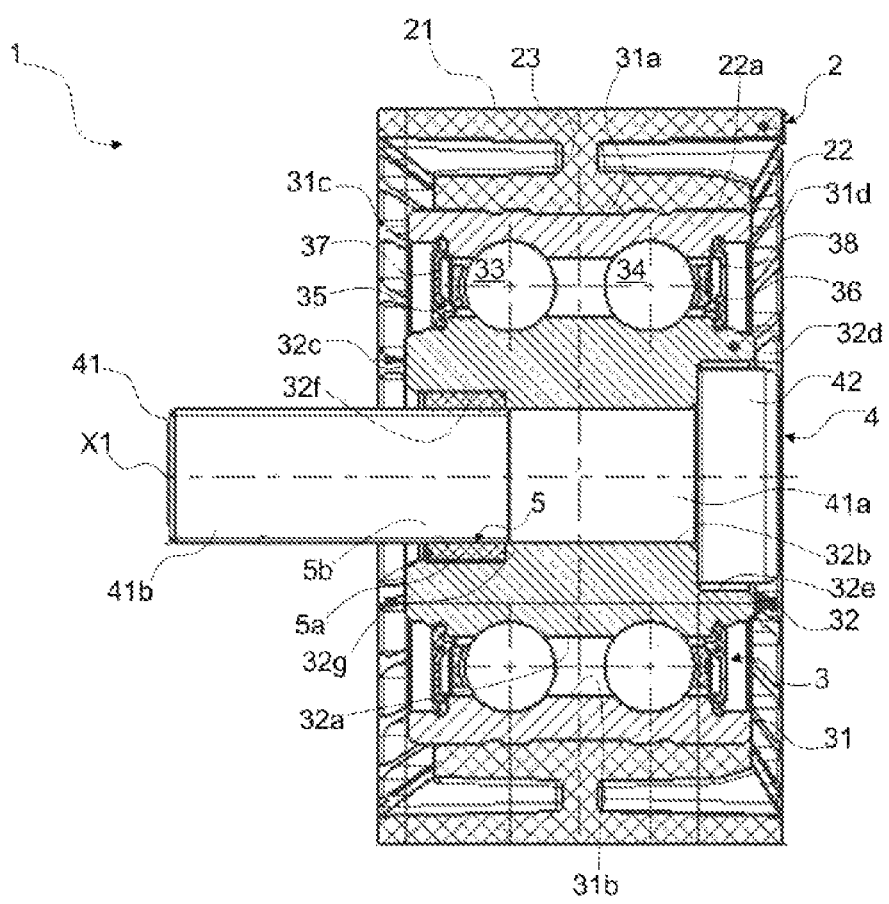
FIG. 1 is a view in cross section of a roller according to a first embodiment.

A tension roller or reel in its entirety is designated by the reference 1 and has a central axis X1. The roller 1 comprises a pulley 2, a bearing 3 and a retaining screw 4, these elements being coaxial to the axis X1 in normal operating mode.

The screw 4 comprises the body 41 in the shape of a rod and a head 42 at one of the free extremities of the body 41. The body 41 includes a smooth portion 41a, of which the outer cylindrical surface is smooth, in proximity to the head 42. The body 41 likewise includes a threaded portion 41b on the other side of the head 42.

The pulley 2 comprises an outer part 21 exhibiting an outer cylindrical surface intended to interact with a torque transmission element (not illustrated) such as a belt or a chain. The pulley 2 likewise comprises an axial inner part 22 and a radial annular intermediate portion 23 connecting the inner part 22 and outer part 21. The inner part 22 and the outer part 21 are coaxial with the axis X1. The inner part 22 comprises a bore 22a in which the bearing 3 is mounted.

The bearing 3 comprises one inner race 31, one outer race 32, two rows of rolling elements 33 and 34, in this case balls, arranged in parallel planes retained respectively by cages 35 and 36, and two sealing joints 37 and 38.

The outer race 31 comprises an outer cylindrical surface 31a that is consistent in shape with the bore 22a of the pulley 2. Preferably, the pulley 2 is moulded onto the outer race 31. The outer race 31 likewise comprises a bore 31b, in which are arranged bearing raceways for the rolling elements 33 and 34, and grooves, into which are pressed the sealing joints 37 and 38, the joints forming a static seal with the rotating outer race 31.

The inner race 32 comprises an outer cylindrical surface 32a, in which are arranged bearing raceways for the rolling elements 33 and 34, and grooves, intended to provide contact with the sealing joints 37 and 38, the joints forming a dynamic seal with the non-rotating inner race 32.

The outer race 31 is delimited axially by two frontal radial edges 31c and 31d, and the inner race is delimited axially by two frontal radial edges 32c and 32d, in such a way that the edges are respectively aligned axially.

The inner race 32 likewise comprises a transverse cylindrical bore 32b, into which a body 41 of the retaining screw 4 is inserted. The bore 32b is a central opening passing axially through the inner race 32 and discharges at each of its extremities in the area of the radial edges 32c and 32d. The threaded portion 41b of the body 41 projects axially in relation to the radial edge 32c of the inner race 32 and is intended to be inserted into a tapped hole provided in a component intended to support the roller 1, in particular a wall of an engine block for a motor vehicle.

Axially on the opposite side, the inner race comprises a blind opening 32e, on the radial edge 32d of which the diameter and the depth are adapted to receive all or part of the head 42 of the screw 4 in such a way that the extremity of the screw head 42 does not extend axially beyond the pulley 2. Provision may likewise be made for the opening 32e to be dimensioned in such a way that the head 42 does not extend axially beyond the radial edge 32d.

Thanks to such an arrangement, it is possible to reduce the axial dimension of the roller 1 mounted on its support as well as the weight of the entire assembly.

In accordance with the invention, the bore 32b of the inner race 32 comprises a cavity 32f which consists of a circumferential cylindrical portion having a radial diameter that is greater than the radial diameter of the cylindrical surface of the bore 32b.

According to FIG. 1 illustrating a first embodiment of the present invention, the cavity 32f extends axially between the radial edge 32c of the inner race 32, on the side of the engine block, and a shoulder 32g formed between the cylindrical surface forming the cavity 32f and the cylindrical surface with a smaller diameter forming the bore 32b.

According to the invention, a retaining ring 5 is fitted securely and integrally in the cavity 32f, the retaining ring 5 comprising means of interaction 5a with the screw 4 so as to allow an axial immobilization of the screw 4 in relation to the bearing 3.

According to this first embodiment, the retaining ring 5 comprises a tubular portion 5b that is coaxial with the axis X1, the portion 5b being installed by force into the cavity 32f. Alternatively, the retaining ring 5 is made of polymer material and is moulded in the cavity 32f.

According to this first embodiment, the means of interaction 5a of the retaining ring 5 consist of a threaded portion, the threaded portion 41b of the screw 4 being installed by screwing into the threaded portion 5a of the retaining ring 5, and the axial immobilization of the screw 4 being assured by the interaction of the threads of the ring 5 and of the screw 4.

Thanks to the invention, the immobilization achieved in this way by tightening is reversible. There is a possibility for an operator to cause the screw 4 to turn in the other direction, if necessary, in such a way as to cause the head 42 of the screw 4 to emerge from the opening 32e. Another advantage is that, in all circumstances, the retaining ring 5 does not move from its position when mounted in the cavity 32f of the inner race 32. The screw 4 is thus retained during transport of the roller 1, while offering the possibility of being retractable for the final securing of the roller 1.

The threads of the threaded portion 5a of the retaining ring 5 are circumferential and extend radially from a tubular portion 5b. The tubular portion 5b is completely integrated into the cavity 32f, and only the threads 5a extend radially beyond the cylindrical surface of the bore 32b of the inner race 32. The threaded portion 5a interacting with the threaded portion 41b of the screw 4, the radial dimension is reduced.

Figure 2A:
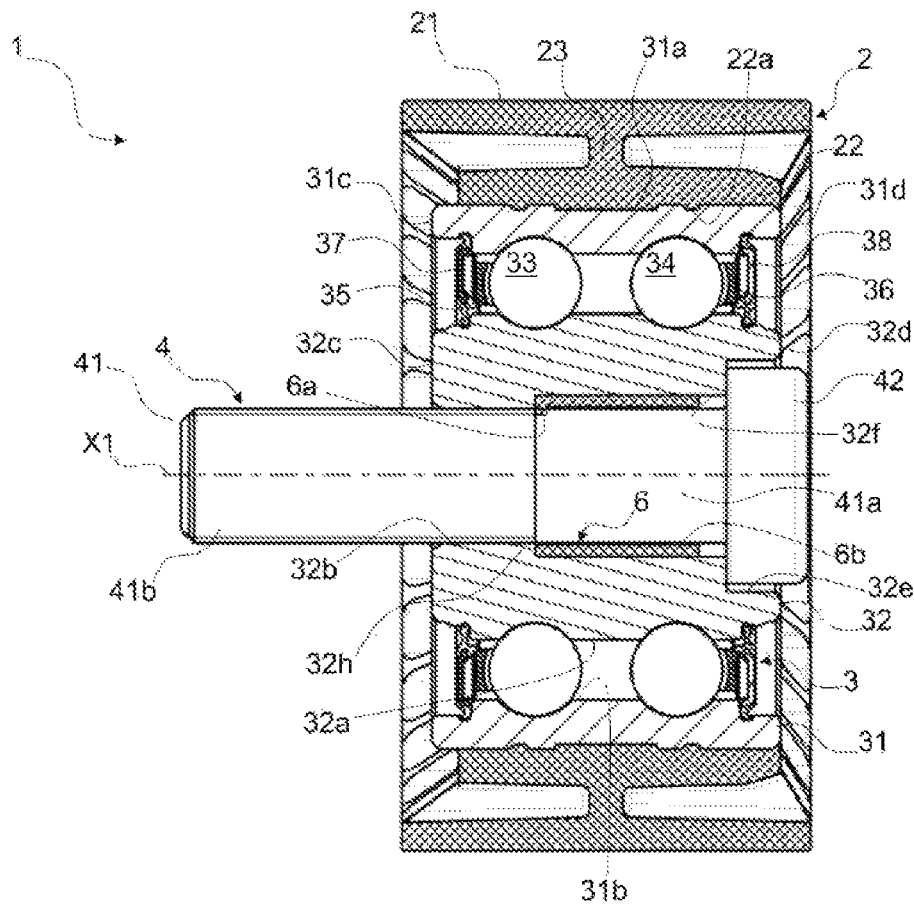
FIG. 2a is a view in cross section of a roller according to a second embodiment.
Figure 2B:
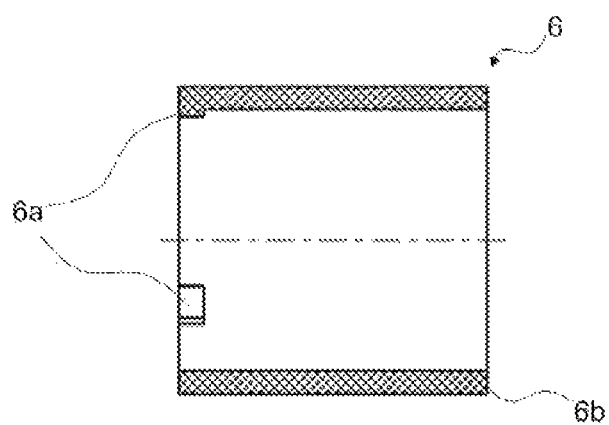
FIG. 2b is a view in cross section of the retaining ring according to this second embodiment.

In accordance with a second embodiment illustrated in FIGS. 2a and 2b, in which identical elements have the same references, the roller 1 differs from the previous embodiment in that the cavity 32f extends axially between the radial edge 32d of the inner race 32, on the opposite side of the engine block, and a shoulder 32h formed between the cylindrical surface forming the cavity 32f and the cylindrical surface with a smaller diameter forming the bore 32b.

A retaining ring 6 is fitted securely and integrally into the cavity 32f and comprises a tubular portion 6b that is coaxial with the axis X1 and means of interaction 6a with the screw 4.

According to this second embodiment, the means of interaction 6a of the retaining ring 6 consist of a plurality of radial projections directed towards the axis X1, that is to say the interior of the roller, the body 41 of the screw being installed by force in the projections 6a.

The projections 6a form lugs of material, extend radially from the tubular portion 6b and are likewise distributed in a circumferential manner in the bore formed by the tubular portion 6b. The tubular portion 6b is completely integrated into the cavity 32f, and only the projections 6a extend radially beyond the cylindrical surface of the bore 32b of the inner race 32. The projections 6a being deformed by the screw 4, the radial dimension is reduced.

Thanks to the invention, the axial immobilization of the screw is assured by radial tightening and is reversible. There is a possibility for an operator to exert an axial force F1 at the extremity of the threaded portion 41b of the screw 4 in the direction of the screw head 42, if necessary, in such a way as to cause the screw head 42 to emerge from the opening 32e. During transport of the roller 1, the screw 4 is thus retained while offering the possibility of being retractable for the final securing of the roller 1.

In a preferential manner, the projections 6a interact with the smooth portion 41b of the screw 4 during transport of the roller 41, in such a way as not to be in contact with the threaded portion 41b and, therefore, to avoid the risk of damaging it.

Figure 3:
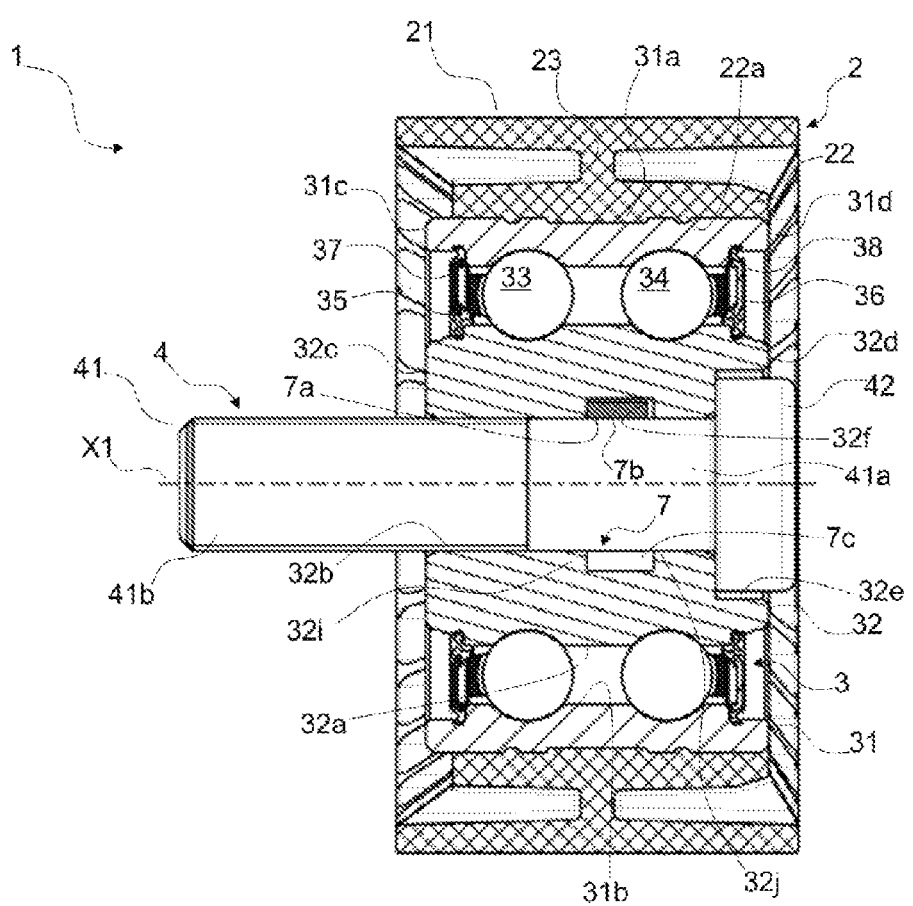
FIG. 3 is a view in cross section of a roller according to a third embodiment.

In accordance with a third embodiment illustrated in FIG. 3, in which identical elements have the same references, the roller 1 differs from the previous embodiment in that the cavity 32f extends axially between two shoulders 32i and 32j formed at each extremity of a cylindrical surface forming the cavity 32f and a cylindrical surface with a smaller diameter forming the bore 32b of the inner race 32.

A retaining ring 7 is fitted securely and integrally into the cavity 32f and comprises a tubular portion 7b that is coaxial with the axis X1, means of interaction 7a with the screw 4 and an axial slot 7c. In this way, the ring 7 is previously compressed radially, thereby permitting a reduction in its outer diameter thanks to its elasticity on the one hand and to the presence of the slot 7c on the other hand, in order to insert it and to cause it to slide axially in the bore 32f between the inner race 32 and then in the cavity 32f between the two shoulders 32i and 32j where it returns to its original shape.

According to this third embodiment, the retaining ring 7 is essentially tubular and has a radial thickness that is strictly greater than the depth of the cavity 32f provided in the bore 32b of the inner race 32. The means of interaction 7a of the retaining ring 7 thus consist of the inner cylindrical surface of the retaining ring 7, the body 41 of the screw 4 being installed by force into the retaining ring 7 and the axial immobilization of the screw 4 being assured by radial tightening.

Thanks to the invention, the axial immobilization of the screw is assured by radial tightening and is reversible. There is the possibility for an operator to exert an axial force F1 at the extremity of the threaded portion 41b of the screw 4 in the direction of the screw head 42, if necessary, in such a way as to cause the screw head 42 to emerge from the opening 32e. During transport of the roller 1, the screw 4 is thus retained while offering the possibility of being retractable for the final securing of the roller 1.

The retaining ring 7 is principally integrated into the cavity 32f, apart from the portion necessary to ensure the tightening with the screw 4, in such a way that the radial dimension is reduced.

In a preferential manner, the retaining ring 7 interacts with the smooth portion 41b of the screw 4 during transport of the roller 41, in such a way as not to be in contact with the threaded portion 41b and, therefore, to avoid the risk of damaging it.

The technical characteristics of the embodiments and variants envisaged above may be combined with each other.

The invention claimed is:

1. A tension roller or reel device for a torque transmission element comprising:
    at least one bearing having one inner ring having a radially outwardly facing inner race and a radially inwardly facing annular surface, the at least one bearing also including one outer ring having a radially inwardly facing outer race and at least one row of rolling elements between the inner race and the outer race,
    a pulley on the outer race, and
    a retaining screw inserted into a central bore of the inner race,
    wherein the radially inwardly facing annular surface includes a first portion having a first diameter and a second portion having a second diameter greater than the first diameter, and wherein the retaining ring is configured to immobilize the screw in relation to the bearing, the retaining ring being integrally mounted in the second portion in direct contact with the inwardly facing annular surface.

2. A tension roller or reel device for a torque transmission element comprising:
    at least one bearing having one inner race, one outer race and at least one row of rolling elements between the one inner race and the one outer race,
    a pulley on top of the outer race, and
    a retaining screw inserted into a central bore of the inner race,
    wherein the bore of the inner race includes a circumferential cavity in which a retaining ring is fitted securely and integrally, the retaining ring comprising immobilization means for immobilizing the screw in relation to the bearing, and
    wherein the cavity provided in the bore of the inner race extends axially between one extremity of the bore and a shoulder formed between a cylindrical surface forming the cavity and a cylindrical surface with a smaller diameter forming the bore.

3. The tension roller or reel device according to claim 1, wherein the second portion extends axially between two shoulders.

4. The tension roller or reel device according to claim 1, wherein the inner ring further comprises on a radial edge a blind opening, of which the diameter and the depth are adapted to receive one of part of a head of the screw or all of the head of the screw in such a way that the extremity of the screw head does not extend axially beyond at least one of the bearing and the pulley.

5. The tension roller or reel device according to claim 1, the retaining ring further comprising an axial slot, wherein the retaining ring is compressed radially beforehand in order to insert it and to cause it to slide in the bore of the inner ring and then in the cavity where it returns to its original shape.

6. The tension roller or reel device according to claim 1, wherein the retaining ring is continuous circumferentially.

7. The tension roller or reel device according to claim 1, wherein the retaining ring is essentially tubular and has a thickness that is one of:
    less than the depth of the cavity provided in the bore of the inner ring, or
    equal to the depth of the cavity provided in the bore of the inner ring.

8. The tension roller or reel device according to claim 1, wherein the retaining ring includes a plurality of radial projections directed towards the interior of the roller, the screw being installed by force into the projections, and the axial immobilization of the screw being assured by radial tightening.

9. The tension roller or reel device according to claim 1, wherein the retaining ring comprises a threaded portion, the screw being installed by screwing into the threaded portion, and the axial immobilization of the screw being assured by the interaction of the threads.

10. The tension roller or reel device according to claim 1, wherein the retaining ring is essentially tubular and has a radial thickness that is strictly greater than the depth of the cavity provided in the bore of the inner race, the screw being installed by force into an inner cylindrical surface of the retaining ring, and the axial immobilization of the screw being assured by radial tightening.

11. An internal combustion engine comprising:
    at least one tension roller or reel device according to claim 1,
    wherein the at least one tension roller or reel device is integrated into to a torque transmission element of an engine.

12. The tension roller or reel device according to claim 1, wherein the retaining ring has an axial length and a radial thickness and wherein the axial length is greater than the radial thickness.

13. The tension roller or reel device according to claim 1, wherein the retaining screw includes a head and wherein the retaining ring is located between the head and the first portion of the annular surface.

14. A tension roller or reel device for a torque transmission element comprising:
    at least one bearing having one inner ring having a radially outwardly facing inner race and a radially inwardly facing annular surface, the at least one bearing also including one outer ring having a radially inwardly facing outer race and at least one row of rolling elements between the inner race and the outer race,
    a pulley on the outer race, and
    a retaining screw inserted into a central bore of the inner race,
    wherein the radially inwardly facing annular surface includes a first portion having a first diameter and a second portion having a second diameter greater than the first diameter, and further including a retaining ring fitted securely in the second portion in direct contact with the inwardly facing annular surface, the retaining ring forming a friction fit or an interference fit with the retaining screw for securing the retaining screw in the bore.

15. The tension roller or reel device according to claim 14, wherein the retaining ring surrounds a threaded portion of the retaining screw.

16. The tension roller or reel device according to claim 14, wherein the retaining ring surrounds a smooth portion of the retaining screw.

17. The tension roller or reel device according to claim 14, wherein the retaining ring includes a plurality of projecting lugs forming a friction fit with the retaining screw.

18. The tension roller or reel device according to claim 14, wherein the retaining ring has an axial length and a radial thickness and wherein the axial length is greater than the radial thickness.

19. The tension roller or reel device according to claim 18, wherein the retaining screw includes a head and wherein the retaining ring is located between the head and the first portion of the annular surface.

20. The tension roller or reel device according to claim 14, wherein the retaining screw includes a head and wherein the retaining ring is located between the head and the first portion of the annular surface.

* * * * *